United States Patent
Ryu et al.

(10) Patent No.: US 10,697,711 B2
(45) Date of Patent: Jun. 30, 2020

(54) AIR-CONDITIONING APPARATUS USING HEAT PIPE

(71) Applicant: NAVER Business Platform Corporation, Seongnam-si (KR)

(72) Inventors: Keunho Ryu, Seongnam-si (KR); Jeongbeom Ko, Seongnam-si (KR); Byoung Nam Choi, Seongnam-si (KR); Chang Dae Lee, Seongnam-si (KR); Deok Soo Jung, Seongnam-si (KR); Woo-jung Kim, Seongnam-si (KR)

(73) Assignee: NAVER Business Platform Corporation, Seongnam-si (KR)

( * ) Notice: Subject to any disclaimer, the term of this patent is extended or adjusted under 35 U.S.C. 154(b) by 35 days.

(21) Appl. No.: 15/892,017

(22) Filed: Feb. 8, 2018

(65) Prior Publication Data

US 2018/0224214 A1 Aug. 9, 2018

(30) Foreign Application Priority Data

Feb. 8, 2017 (KR) .......................... 10-2017-0017585

(51) Int. Cl.
*F28D 15/04* (2006.01)
*F24F 5/00* (2006.01)
(Continued)

(52) U.S. Cl.
CPC ............ *F28D 15/04* (2013.01); *F24F 5/0035* (2013.01); *F24F 12/002* (2013.01);
(Continued)

(58) Field of Classification Search
CPC .. F28D 15/04; F28D 21/0014; F28D 15/0275; F24F 5/0035; F24F 12/002
See application file for complete search history.

(56) References Cited

U.S. PATENT DOCUMENTS

| 7,572,179 B2 * | 8/2009 | Choi ...................... F24F 3/1411 165/54 |
| 2007/0180851 A1 * | 8/2007 | Fujiyoshi ............... F24F 3/1411 62/480 |
| 2015/0011153 A1 * | 1/2015 | Oswald ................... F24F 3/161 454/187 |

FOREIGN PATENT DOCUMENTS

| DE | 3405584 A1 * | 8/1985 | ............ F24F 12/002 |
| KR | 101295312 B1 | 8/2013 | |
| KR | 101346747 B1 | 12/2013 | |

OTHER PUBLICATIONS

DE 3405584 A1 translation.*

* cited by examiner

*Primary Examiner* — Jon T. Schermerhorn, Jr.
(74) *Attorney, Agent, or Firm* — Greer Burns & Crain Ltd.

(57) ABSTRACT

Disclosed is an air-conditioning apparatus using a heat pipe. The state of the outside air is compared with the state of set supply air. The heat exchange and mixed supply of outside air and ventilation air are effectively performed by changing the passage of the ventilation air and the outside air through the selective opening/shutting of dampers, cooling the outside air through latent heat by spraying mist, and by controlling supply air in a set state through the cooling and humidification of the supply air. Accordingly, energy efficiency can be improved and the energy necessary for the air-conditioning apparatus can be reduced using the evaporation latent heat of water. Furthermore, operation costs can be reduced and financial gains can be obtained because an efficient operation can be performed in response to the state of a measured outside air.

8 Claims, 8 Drawing Sheets

(51) Int. Cl.
  *F28D 21/00* (2006.01)
  *F24F 12/00* (2006.01)
  *F28D 15/02* (2006.01)
(52) U.S. Cl.
  CPC ..... *F28D 15/0275* (2013.01); *F28D 21/0014* (2013.01); *F24F 2012/005* (2013.01)

AIR-CONDITIONING APPARATUS USING HEAT PIPE

CROSS REFERENCE TO RELATED APPLICATION

The present application claims the benefit of Korean Patent Application No. 10-2017-0017585 filed in the Korean Intellectual Property Office on Feb. 8, 2017, the entire contents of which are incorporated herein by reference.

BACKGROUND OF THE INVENTION

The present invention relates to an air-conditioning apparatus and, more particularly, to an air-conditioning apparatus using a heat pipe, wherein the state (e.g., temperature, humidity, wet-bulb temperature or enthalpy) of outside air with the set state (e.g., temperature or humidity) of supply air, and the supply air is supplied in the set state (temperature, humidity) by controlling the supply air by changing the flow passage of ventilation air and outside air through the selective opening/shutting of dampers, cooling the outside air by latent heat by spraying mist, and cooling and humidifying the supply air.

In general, air-conditioning has an object of making people in a house, hotel, meeting hall, office, a computer center and a variety of types of industrial facilities in a comfortable state by maintaining comfortable indoor conditions, such as temperature, humidity, scent and air current, in a state suitable for intended purposes of the place. The state of the indoor air which is comfortable for people does not have a specific value because it is influenced by several conditions, such as the climate, clothing, the standard of living and the health of the people. In order for the places, such as the workshop of a factory, a warehouse, a laboratory and a computer center, to sufficiently achieve their intended functions, the indoor air must maintain a state most suitable for things produced, processed, stored or tested in the places or a variety of types of apparatuses operating in corresponding places.

For example, air-conditioning is used so that quality of a product is uniform and defective products are not generated. For example, humidity is relatively set high in a cigarette factory so that tobacco leaves are not cut into small pieces and overly dried into powder, the temperature is set low in the chocolate factory so that chocolate does not melt to lose the original shape, dust is reduced to a minimum in a semiconductor fabrication factory, and the flow of air is made slow by considering the influence of air flow on living things in a physiological laboratory.

Korean Patent Nos. 10-1346747 and 10-1295312 disclose an air-conditioning apparatus using an indirect heat exchanger in which synthetic resin, paper or non-woven fabric are stacked.

In the conventional technology, outside air is directly supplied indoors or the inside air is circulated and resupplied indoors again. In order for the air supplied indoors to have a set temperature, the temperature of the air supplied indoors is controlled by indirectly heat-exchanging the outside air and the inside air selectively.

However, in the conventional technology that uses an indirect heat exchanger in which synthetic resin, paper or non-woven fabric are stacked, the heat exchange efficiency is low because thermal conductivity is low, and energy consumption for heating or cooling air supplied indoors is increased due to low heat exchange efficiency.

BRIEF SUMMARY OF THE INVENTION

An object of the present invention is to provide an air-conditioning apparatus using a heat pipe, which can obtain an additional cooling effect using outside air as cooling energy by heat-exchanging the outside air using a heat pipe and evaporating and cooling the outside air through mist spray for the outside air upon performing the heat exchange of the heat pipe, reduce energy necessary for the operation of the air-conditioning apparatus by supplying the outside air as supply air and discharging ventilation air in the (pre-cooling) condition in which the outside air can be directly used as the supply air, reduce energy for the air-conditioning apparatus by improving energy efficiency using the evaporation latent heat of water through a structure in which the supply air selectively passes through a cooling coil or the humidity of the supply air can be controlled and the effective heat exchange and mixed supply of the outside air and the ventilation air, and can have financial gains by reducing operation costs because an efficient operation can be performed in response to the state (e.g., temperature, humidity, and wet-bulb temperature) of the measured outside air.

An air-conditioning apparatus using a heat pipe according to an example of the present invention includes a ventilation block providing a passage through which ventilation air (RA) introduced from indoors flows, an air exhaust block having one end connected to the ventilation block and providing a passage through which exhaust air (EA) discharged to the outside flows, an air supply block providing a passage through which a supply air (SA) supplied indoors flows, an outside air block having one end connected to the air supply block and providing a passage through which outside air (OA) introduced from the outside flows, a first heat exchange block including a condensation unit of a heat pipe, connected to the outside air block and the air exhaust block, changing outside air introduced through the outside air block into exhaust air through the heat pipe, and discharging the changed exhaust air to the air exhaust block, and a second heat exchange block including an evaporation unit of the heat pipe, connected to the ventilation block and the air supply block, changing ventilation air introduced through the ventilation block into supply air through the heat pipe, and discharging the changed supply air to the air supply block, wherein the second heat exchange block selectively discharges the ventilation air introduced through the ventilation block directly to the air supply block, mixes the ventilation air and the outside air, changes the mixed ventilation air and outside air into a supply air, and supplies the supply air.

In this case, the air-conditioning apparatus using a heat pipe according to an example of the present invention may operate in any one of a ventilation air operation mode in which only ventilation air is selectively changed into supply air depending on the state of outside air or a state of ventilation air and supply air and the changed supply air is supplied indoors, a mixed operation mode in which ventilation air and outside air are mixed, changed into supply air and supplied indoors, and a full outside air operation mode in which only outside air is changed into supply air and supplied indoors.

Furthermore, the ventilation block according to an example of the present invention includes a first air damper disposed in a boundary of the ventilation block and the air exhaust block and selectively opened and shut to discharge ventilation air flowing into the ventilation block to the air exhaust block and a second air damper disposed in the ventilation block and selectively opened and shut to discharge ventilation air flowing into the ventilation block to the second heat exchange block.

Furthermore, the outside air block according to an example of the present invention includes a first air filter disposed in an outside air damper disposed in an opening through which outside air is introduced to remove alien substances included in the outside air, a third air damper disposed in the boundary line of the outside air block and the first heat exchange block and selectively opened and shut to discharge outside air flowing into the outside air block to the first heat exchange block, a fourth air damper disposed in the boundary line of the outside air block and the air supply block and selectively opened and shut to discharge outside air flowing into the outside air block to the air supply block, a second air filter disposed in the fourth air damper to remove alien substances included in the outside air passing through the fourth air damper, a first temperature/humidity sensor disposed in an opening through which outside air is introduced from the outside to measure a temperature and humidity of the outside air introduced through the opening from the outside, and a first temperature sensor disposed close to the third air damper to measure a temperature of the outside air after the outside air passes through the third air damper.

Furthermore, the air supply block according to an example of the present invention includes a first air volume measurement sensor disposed within the air supply block to measure an air volume within the air supply block, first ventilation unit disposed within the air supply block to selectively control the air volume of a supply air, a second temperature/humidity sensor disposed within the air supply block to measure a temperature and humidity of the supply air through the first ventilation unit, and a second temperature sensor disposed at the back of the first ventilation unit to measure a temperature of a heat pipe exit.

In this case, the air-conditioning apparatus according to an example of the present invention further includes a humidifier disposed at the front of the first ventilation unit of the air supply block to selectively humidify supply air flowing into the air supply block depending on a setting state so that the supply air is humidified.

Moreover, the air exhaust block according to an example of the present invention includes a second air volume measurement sensor disposed within the air exhaust block to measure an air volume within the air exhaust block, second ventilation unit disposed within the air exhaust block to selectively control the air volume of exhaust air, and a third temperature/humidity sensor disposed within the air exhaust block to measure a temperature and humidity of the exhaust air through the second ventilation unit.

Furthermore, the air-conditioning apparatus according to an example of the present invention further includes a third temperature sensor disposed in the condensation unit of the heat pipe of the first heat exchange block to measure a temperature of outside air through the heat pipe and a mist spray nozzle disposed at the front of the first heat exchange block connected to the outside air block to selectively spray mist to outside air through the outside air block depending on a set temperature.

Furthermore, the second heat exchange block according to an example of the present invention includes a fourth temperature sensor disposed in the evaporation unit of the heat pipe within the second heat exchange block to measure a temperature of ventilation air before the ventilation air passes through the heat pipe, a cooling coil disposed at the back of the evaporation unit of the heat pipe within the second heat exchange block to selectively cool ventilation air through the heat pipe, and a third air filter disposed at the front of the evaporation unit of the heat pipe to filter alien substances included in an air passing through the heat pipe.

An air-conditioning apparatus using a heat pipe according to another example of the present invention includes an air supply block providing a passage through which supply air (SA) supplied indoors flows, ventilation block disposed on left and right sides of the air supply block, respectively, with the air supply block disposed at a center, and providing a passage through which ventilation air (RA) introduced from indoors flows, an air exhaust block disposed on one side of the ventilation block and providing a passage through which exhaust air (EA) discharged to the outside flows, an outside air block disposed on a side opposite the air supply block and providing a passage through which outside air (OA) introduced from the outside flows, a first heat exchange block including a condensation unit of a heat pipe, connected to the outside air block and the air exhaust block, changing outside air introduced through the outside air block into an exhaust through the heat pipe, and discharging the changed exhaust air to the air exhaust block, and a second heat exchange block including an evaporation unit of the heat pipe, connected to the ventilation block and the air supply block, changing ventilation air introduced through the ventilation block into supply air through the heat pipe, and discharging the changed supply air to the air supply block, wherein the second heat exchange block selectively discharges the ventilation air introduced through the ventilation block directly to the air supply block, mixes the ventilation air and the outside air, changes the mixed ventilation air and outside air into supply air, and supplies the supply air.

In this case, the air-conditioning apparatus using a heat pipe according to another example of the present invention may also operate in any one of a ventilation air operation mode in which only ventilation air is selectively changed into a supply air depending on the state of outside air or a state of ventilation air and supply air and the changed supply air is supplied indoors, a mixed operation mode in which ventilation air and outside air are mixed, changed into supply air and supplied indoors, and a full outside air operation mode in which only outside air is changed into supply air and supplied indoors.

Furthermore, the ventilation block according to another example of the present invention includes a first air damper disposed in the boundary line of the ventilation block and the air exhaust block and selectively opened and shut to discharge ventilation air flowing into the ventilation block to the air exhaust block, a second air damper disposed in the ventilation block and selectively opened and shut to discharge the ventilation air flowing into the ventilation block to the second heat exchange block, a first air volume measurement sensor disposed within the ventilation block to measure an air volume within the ventilation block, and first ventilation unit disposed within the ventilation block to selectively control an air volume within the ventilation block.

Furthermore, the outside air block according to another example of the present invention includes a first air filter disposed in an outside air damper disposed in an opening through which outside air is introduced to remove an alien substance included in the outside air, second ventilation unit disposed within the outside air block to selectively control the air volume of exhaust air, a fourth air damper disposed in the boundary line of the outside air block and the air supply block and selectively opened and shut to discharge outside air flowing into the outside air block to the air supply block, a second air filter disposed in the fourth air damper to remove an alien substance included in the outside air through the fourth air damper, and a first temperature/humidity sensor disposed in an opening through which outside air is introduced from the outside to measure a temperature and humidity of the outside air introduced through the opening from the outside.

Furthermore, the first heat exchange block according to another example of the present invention includes a third air damper disposed in the boundary line of the outside air block and the first heat exchange block and selectively opened and shut to discharge outside air flowing into the outside air block to the first heat exchange block and a first temperature sensor disposed close to the third air damper to measure a temperature of outside air after the outside air passes through the third air damper.

Moreover, the second heat exchange block according to another example of the present invention includes a third air filter disposed at the front of the evaporation unit of the heat pipe to filter an alien substance included in air passing through the heat pipe, a cooling coil disposed at the back of the evaporation unit of the heat pipe to selectively cool ventilation air through the heat pipe, and a humidifier disposed at the back of the cooling coil to selectively humidify air drained to the air supply block depending on a setting state.

DETAILED DESCRIPTION OF THE INVENTION

Figure 1:
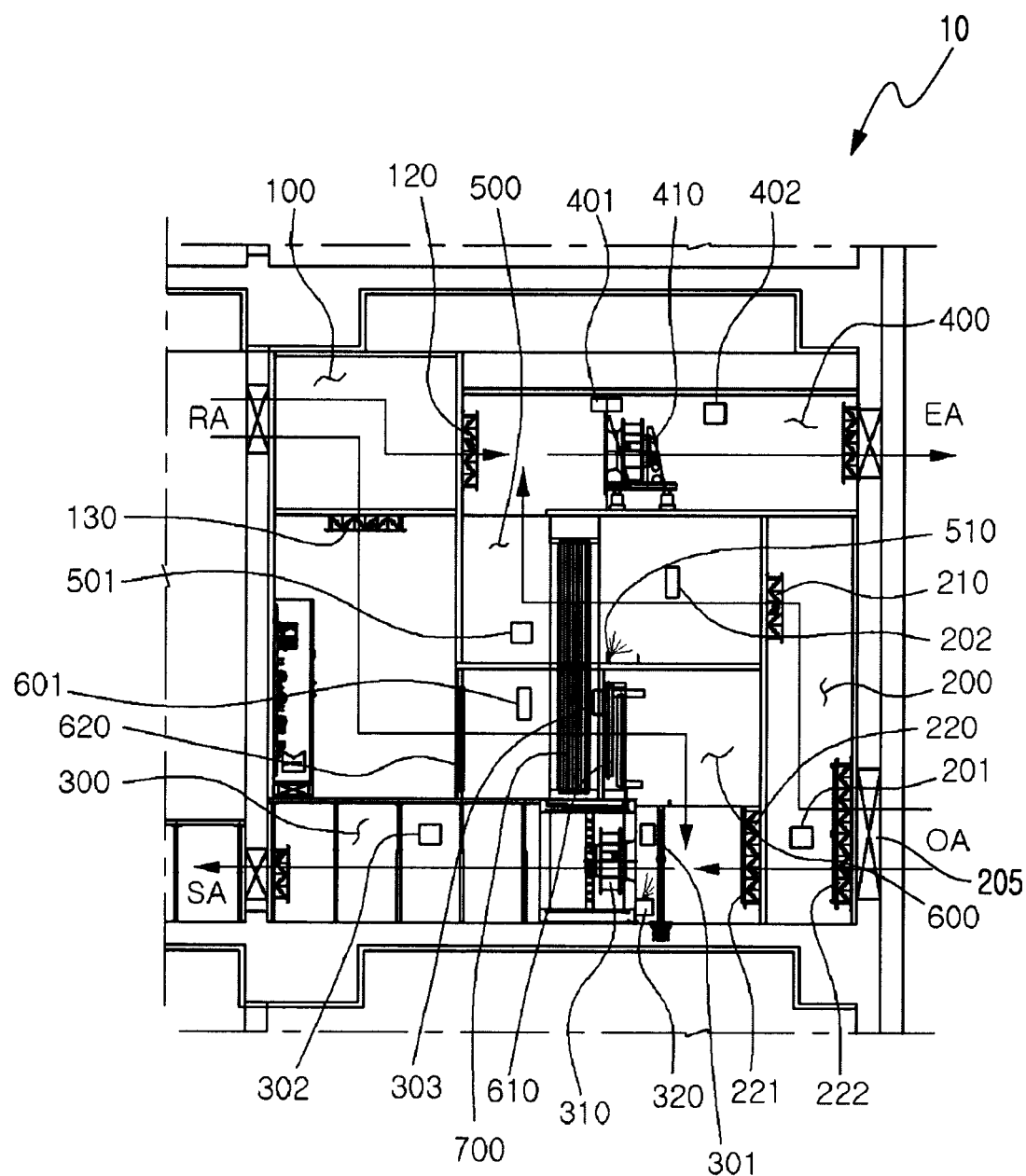
FIG. 1 is an exemplary diagram of a cross-sectional view of an air-conditioning apparatus using a heat pipe according to an embodiment of the present invention.

Hereinafter, embodiments of the present invention are described in detail below with reference to the accompanying drawings. Terms or words used in the specification and claims should be construed as having meanings and concepts that comply with the technological spirit of the present invention based on the principle that an inventor may appropriately define the concept of a term in order to describe his or her invention in the best manner.

Accordingly, configurations described in the embodiments of this specification and shown in the drawings are exemplary embodiments of the present invention and represent the technological spirit of the present invention. Accordingly, it would be understood that a variety of equivalents and modifications which may substitute the embodiments at the time of filing of this application may be present.

First, a heat pipe includes a container in a pipe form, a wick (i.e., a metal wick structure) embedded in the container, and an operating fluid. The wick is a porous structure capable of generating a capillary force.

The inside of the heat pipe is sealed to maintain a vacuum state. A sealed operating fluid is easily evaporated in a low temperature. When heat is applied to the evaporation unit (one end) of the heat pipe, the operating fluid has pressure higher than that in a condensation unit (the other end) because it absorbs surrounding heat and evaporates. Accordingly, the operating fluid moves to the condensation unit due to a pressure difference between the evaporation unit and the condensation unit. The operating fluid in the condensation unit discharges heat to the surroundings, condenses, and thus has low pressure. As a result, the operating fluid moves to the evaporation unit again.

Accordingly, the heat pipe is divided into an evaporation unit (one end), a condensation unit (the other end), and an insulation part (or intermediate part) between the evaporation unit and the condensation unit. The evaporation unit of the heat pipe absorbs heat from a heat source, and performs a cooling function of absorbing heat from the surroundings as the operating fluid evaporates into a gaseous state. In contrast, the condensation unit performs a heating function of discharging heat as the operating fluid condenses.

Furthermore, the heat pipe is a heat exchanger in which a heating medium (i.e., operating fluid) can move due to a pressure difference between the evaporation unit and the condensation unit in a phase change process, such as the evaporation and condensation of the operating fluid and thus the absorption (or cooling) and discharge (or heating) process of heat are consecutively performed without a separate power source.

An embodiment of the present invention relates to an air-conditioning apparatus using a heat pipe, wherein the state (e.g., temperature or humidity) of outside air with the set state (e.g., temperature or humidity) of supply air, and the supply air is supplied in the set state (temperature, humidity) by controlling the supply air by changing the flow passage of ventilation air and outside air through the selective opening/shutting of dampers, cooling the outside air by latent heat by spraying mist, and cooling and humidifying the supply air. The air-conditioning apparatus is described below with reference to the accompanying drawings.

Referring to FIG. 1, air-conditioning apparatus 10 using a heat pipe according to an embodiment of the present invention includes a ventilation block 100, an outside air block 200, an air supply block 300, an air exhaust block 400, a first heat exchange block 500, and a second heat exchange block 600. In the present invention, one side and the other side or the front and the back indicative of directions are described based on the direction in which a fluid, i.e., air flow, moves. The direction in which a fluid is introduced is one side or the front and the direction in which a fluid is drained (or discharged) is the other side or the back.

First, the ventilation block 100 provides a passage through which ventilation air introduced from the inside of a structure to be cooled (not shown) flows from one side to the other side of the ventilation block 100. One side of the ventilation block 100 is connected to the structure in such a way as to communicate with the inside of the structure so that the ventilation air is introduced into the air-conditioning apparatus 10 from inside of the structure, and the other side of the ventilation block 100 is connected to the first heat exchange block 500 and the second heat exchange block 600 in such a way as to communicate with them so that the ventilation air is drained into the first heat exchange block 500 and the second heat exchange block 600.

The ventilation block 100 is equipped with a plurality of air dampers that controls the flow of the ventilation air. A first air damper 120 is disposed in an opening in a boundary or wall between the ventilation block 100 and the air exhaust block 400, and enables the ventilation block 100 and the air exhaust block 400 to communicate with each other. Ventilation air introduced from indoors to the ventilation block 100 is selectively drained into the ventilation block 100 and the air exhaust block 400 directly by the selective opening and closing of the first air damper 120.

Furthermore, a second air damper 130 is disposed in an opening in a boundary or wall between the ventilation block 100 and the second heat exchange block 600, and enables the ventilation block 100 and the second heat exchange block 600 to communicate with each other. Ventilation air introduced from indoors to the ventilation block 100 is selectively drained to the ventilation block 100 and the second heat exchange block 600 by the selective opening and closing of the second air damper 130.

Furthermore, the outside air block 200 provides a passage through which outside air introduced from the outside through an outside air damper 205 flows from one side to the other side of the outside air block 200. One side of the outside air block 200 is connected to the outside air damper 205 in such a way as to communicate therewith so that the outside air is introduced into the air-conditioning apparatus 10, and the other side thereof is connected to the first heat exchange block 500 and the air supply block 300 in such a way as to communicate with them so that the introduced outside air is drained to the first heat exchange block 500 and the air supply block 300.

A third air damper 210 is disposed in an opening in a boundary or wall between the outside air block 200 and the first heat exchange block 500, and enables the outside air block 200 and the first heat exchange block 500 to communicate with each other. Outside air introduced from the outside to the outside air block 200 is selectively drained from the outside air block 200 into the first heat exchange block 500 by the selective opening and closing of the third air damper 210.

Furthermore, a fourth air damper 220 is disposed in an opening in a boundary or wall between the outside air block 200 and the air supply block 300, and enables the outside air block 200 and the air supply block 300 to communicate with each other. Outside air introduced from the outside to the outside air block 200 is selectively drained from the outside air block 200 into the air supply block 300 by the selective opening and closing of the fourth air damper 220.

A first air filter 222 is disposed in the outside air damper 205, and a second air filter 221 is disposed in the fourth air damper 220. The first air filter 222 removes alien substances (e.g., dust) included in outside air introduced from the outside air block 200 to the second heat exchange block 600 by filtering the alien substances. The second air filter 221 secondarily filters the air primarily filtered by the first air filter 222, and forwards the filtered air to the air supply block 300.

The first air filter 222 disposed in the outside air damper 205 performs a pre-filter function, and the second air filter 221 performs a medium filter function.

Furthermore, a first temperature/humidity sensor 201 is disposed in an opening in the outside wall of the outside air block 200, and measures the temperature and the humidity of outside air introduced from the outside of the air-conditioning apparatus 10 into the outside air block 200. A first temperature sensor 202 is disposed inside the first heat exchange block 500, close to and downstream of the third air damper 210, and measures the temperature of outside air drained into the first heat exchange block 500 through the third air damper 210.

The air supply block 300 provides a passage through which supply air supplied indoors flows. One side of the air supply block 300 is connected to the second heat exchange block 600 and the outside air block 200 in such a way as to communicate with them, so the supply air changed from the ventilation air through the second heat exchange block 600 can be introduced into the air supply block 300 and/or outside air is directly introduced through the outside air block 200. The other side of the air supply block 300 is connected to the structure to be cooled in such a way as to communicate with the inside of the structure, so the supply air introduced from the second heat exchange block 600 and/or the outside air can be guided and supplied indoors (inside of the structure to be cooled).

A first ventilation unit 310, such as a ventilation fan, is provided within the air supply block 300 for moving supply air through the air supply block 300. The driving and rotation speed of the first ventilation unit 310 are selectively controlled to adjust the air volume of supply air supplied indoors from the air supply block 300. A humidifier 320 is provided at the front end of the air supply block 300 so that the supply air drained from the second heat exchange block 600 to the air supply block 300 is selectively humidified.

Furthermore, a first air volume measurement sensor 301 is provided within the air supply block 300, near the front end. The first air volume measurement sensor 301 measures an air volume within the air supply block 300.

Furthermore, a second temperature/humidity sensor 302 is provided within the air supply block 300. The second temperature/humidity sensor 302 measures the temperature and the humidity of the supply air through the first ventilation unit 310. A second temperature sensor 303 is provided in the second heat exchange block 600 at the back (downstream) of the heat pipe 700, and measures temperature of air that passed through the heat pipe.

The air exhaust block 400 provides a passage through which exhaust air discharged from inside the air-conditioning apparatus 10 to the outside flows. One side of the air exhaust block 400 is connected to the ventilation block 100 and the first heat exchange block 500 in such a way as to communicate with them, so that the exhaust air from the ventilation block 100 and the first heat exchange block 500 is introduced into the air exhaust block 400. The other side of the air exhaust block 400 is connected to the outside in such a way as to communicate with the outside, so that the exhaust air introduced from the ventilation block 100 and the first heat exchange block 500 is guided and discharged to the outside.

The air exhaust block 400 also includes a second ventilation unit 410, such as an exhaust fan, provided in the air exhaust block 400 for moving ventilation air and/or outside air through the exhaust block 400. The driving and rotation speed of the second ventilation unit 410 are selectively controlled to adjust the air volume of exhaust air discharged from the air exhaust block 400 to the outside.

Furthermore, a second air volume measurement sensor 401 is provided within the air exhaust block 400. The second air volume measurement sensor 401 measures air volume within the air exhaust block 400.

Furthermore, a third temperature/humidity sensor 402 is provided at the back (downstream) of the second ventilation unit 410. The third temperature/humidity sensor 402 measures the temperature and the humidity of the exhaust air passing through the second ventilation unit 410.

The first heat exchange block 500 and the second heat exchange block 600 of the air-conditioning apparatus 10 using a heat pipe according to an embodiment of the present invention are disposed in a stack form and share a heat pipe 700. The first heat exchange block 500 contains the upper side of the heat pipe 700, the second heat exchange block 600 contains the lower side of the heat pipe 700, and the heat pipe 700 is disposed in a form that is upright at the center of the first heat exchange block 500 and the second heat exchange block 600 in an up and down stacked form.

The heat pipe 700 enables the consecutive absorption (cooling) and discharge (heating) process of heat without a separate power source because a heating medium (e.g., operating fluid) can flow due to a pressure difference between the evaporation unit and the condensation unit in a phase change process, such as the evaporation and condensation of the operating fluid.

The first heat exchange block 500 containing the upper side of the heat pipe 700 includes the condensation unit (the upper end) of the heat pipe 700. One side of the first heat exchange block 500 to which outside air is introduced is connected to the outside air block 200, and the opposite side is connected to the ventilation block 100 and the air exhaust block 400.

In an embodiment of the present invention, the heat pipe 700 has been illustrated as including the condensation unit within the first heat exchange block 500, but the present invention is not limited thereto. For example, the heat pipe 700 may include an evaporation unit within the first heat exchange block 500.

The first heat exchange block 500 selectively guides ventilation air through the ventilation block 100 and outside air (or exhaust air) through the heat pipe 700 from the outside air block 200, into the air exhaust block 400 so that the ventilation air or the outside air flows through the air exhaust block 400.

A third temperature sensor 501 is disposed in the first heat exchange block 500 near and downstream of the condensation unit (the upper end) of the heat pipe 700, and measures temperature of the outside air that has passed through the heat pipe 700.

Furthermore, a mist spray nozzle 510 is provided at the front of the first heat exchange block 500 connected to the outside air block 200. The mist spray nozzle 510 selectively sprays mist to the outside air introduced through the outside air block 200 so that the outside air is cooled by the evaporation latent heat phenomenon of the mist.

Furthermore, the second heat exchange block 600 containing the lower side of the heat pipe 700 includes the lower piece of the heat pipe 700. One side of the second heat exchange block 600 into which ventilation air is introduced is connected to the ventilation block 100, and the opposite side is connected to the outside air block 200 and the air supply block 300.

In an embodiment of the present invention, the heat pipe 700 has been illustrated as including the evaporation unit within the second heat exchange block 600, but the present invention is not limited thereto. For example, the heat pipe 700 may include a condensation unit within the second heat exchange block 600.

The second heat exchange block 600 selectively changes ventilation air through the heat pipe 700 from the ventilation block 100 or outside air through the outside air block 200 into supply air, and guides the changed supply air so that it flows into the air supply block 300.

Moreover, the second heat exchange block 600 selectively enables ventilation air and outside air to be introduced thereto from the ventilation block 100 and the outside air block 200, respectively, at the same time. The second heat exchange block 600 mixes the ventilation air and the outside air, changes the mixed air into supply air, and guides the changed supply air so that it flows into the air supply block 300.

Furthermore, a fourth temperature sensor 601 is disposed near the evaporation unit of the heat pipe 700 (the lower end) within the second heat exchange block 600, and measures the temperature of the ventilation air before it passes through the heat pipe 700.

Furthermore, a cooling coil 610 is provided at the back of the evaporation unit (the lower end) of the heat pipe 700 of the second heat exchange block 600. The cooling coil 610 selectively cools the ventilation air (or supply air) that has passed through the heat pipe 700.

A third air filter 620 is provided at the front of the evaporation unit (the lower end) of the heat pipe 700 within the second heat exchange block 600, and removes alien substances (e.g., dust) introduced through the ventilation block 100 and included in the ventilation air that flows into the second heat exchange block 600 by filtering the alien substances.

The air-conditioning apparatus 10 using the heat pipe 700 according to an embodiment of the present invention compares the state of the outside air according to the season of the year with the state of a set supply air, controls the supply air in the set state by a change in the flow of ventilation air and outside air through the air-conditioning apparatus 10 by the selective opening/shutting of the dampers, by the cooling of the outside air through latent heat by spraying mist, and by the cooling and humidification of the supply air, and provides the controlled supply air. Embodiments of such operations are described below.

The air-conditioning apparatus 10 according to an embodiment of the present invention operates in any one of a ventilation air operation mode in which only the ventilation air is selectively changed into supply air depending on the state of the outside air or the state of the ventilation air and the supply air, and the supply air is supplied indoors, a mixed operation mode in which the ventilation air and the outside air are mixed, changed into supply air and supplied indoors, and a full outside air operation mode in which only the outside air is changed into supply air and supplied indoors.

Figure 2:
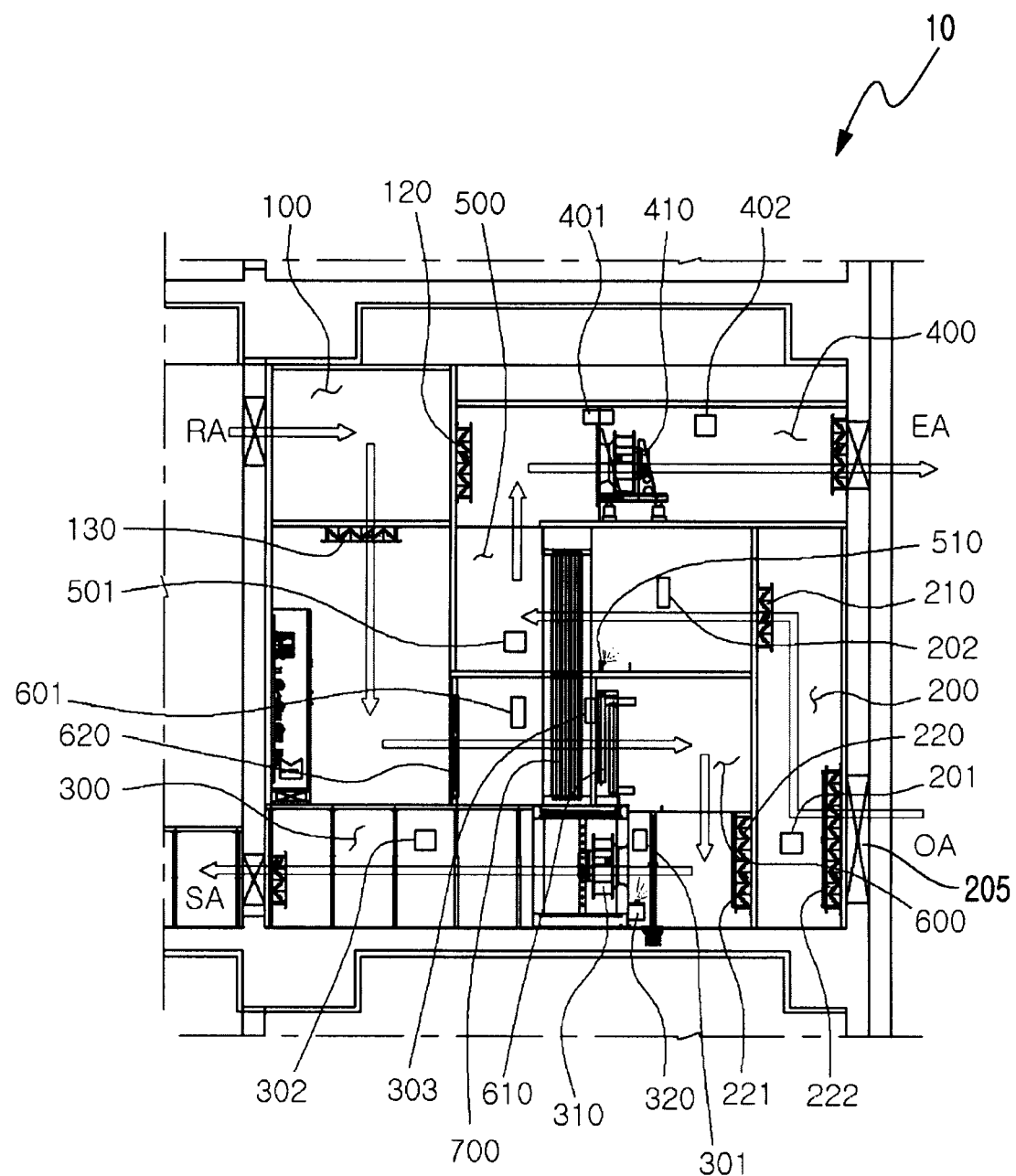
FIG. 2 is an exemplary diagram showing the state in which air-conditioning is controlled by the circulation of ventilation air (RA) according to an embodiment of the present invention.

The operation modes are described in more detail. Referring to FIG. 2, the ventilation air operation mode is an air-conditioning operation mode in which only the ventilation air circulates and supplied indoors. The ventilation block 100 opens the second air damper 130 so that the ventilation air flows from indoors to the second heat exchange block 600 along the ventilation block 100. At this time, the first air damper 120 of the ventilation block 100 is closed, so the entire ventilation air introduced from indoors to the ventilation block 100 flows into the second heat exchange block 600.

Furthermore, the outside air block 200 closes the fourth air damper 220 and opens the third air damper 210, so the outside air flows from the outside to the first heat exchange block 500 along the outside air block 200.

At this time, before the outside air passes through the first heat exchange block 500, it is cooled by the evaporation latent heat phenomenon of mist sprayed by the mist spray nozzle 510 and passes through the first heat exchange block 500.

In this case, the ventilation air through the second heat exchange block 600 and the outside air through the first heat exchange block 500 are indirectly heat-exchanged by the heat pipe 700 while passing through the heat pipe 700. The ventilation air through the second heat exchange block 600 passes through the evaporation unit (the lower end) of the heat pipe 700. The outside air through the first heat exchange block 500 passes through the condensation unit (the upper end) of the heat pipe 700. The ventilation air through the evaporation unit (the lower end) of the heat pipe 700 is cooled by the evaporation unit through the heat pipe 700 because the heat of the ventilation air is deprived by the evaporation of the operating fluid and is changed into supply air. The changed supply air is supplied indoors from the second heat exchange block 600 through the air supply block 300.

At this time, the ventilation air through the evaporation unit (the lower end) of the heat pipe 700 passes through the cooling coil 610. The cooling coil 610 may selectively operate depending on the results of a comparison of the set supply air temperature with the actual temperature of the ventilation air measured by the second temperature sensor 303 after the ventilation air passes through the heat pipe 700, and further cool the ventilation air, if required. The humidifier 320 may also selectively operate depending on the results of a comparison of the set supply air humidity with the actual humidity of the supply air in the air supply block 300 measured by the second temperature/humidity sensor 302, and humidify the ventilation air, if required.

Furthermore, the exhaust air changed from the outside air by the condensation unit (the upper end) of the heat pipe 700 from the first heat exchange block 500 flows into the air exhaust block 400 and is discharged to the outside along the air exhaust block 400.

The ventilation air operation mode drives the mist spray nozzle 510 and the cooling coil 610 depending on the set or predetermined temperature of the supply air in comparison with the outside air and/or the ventilation air.

Figure 3:
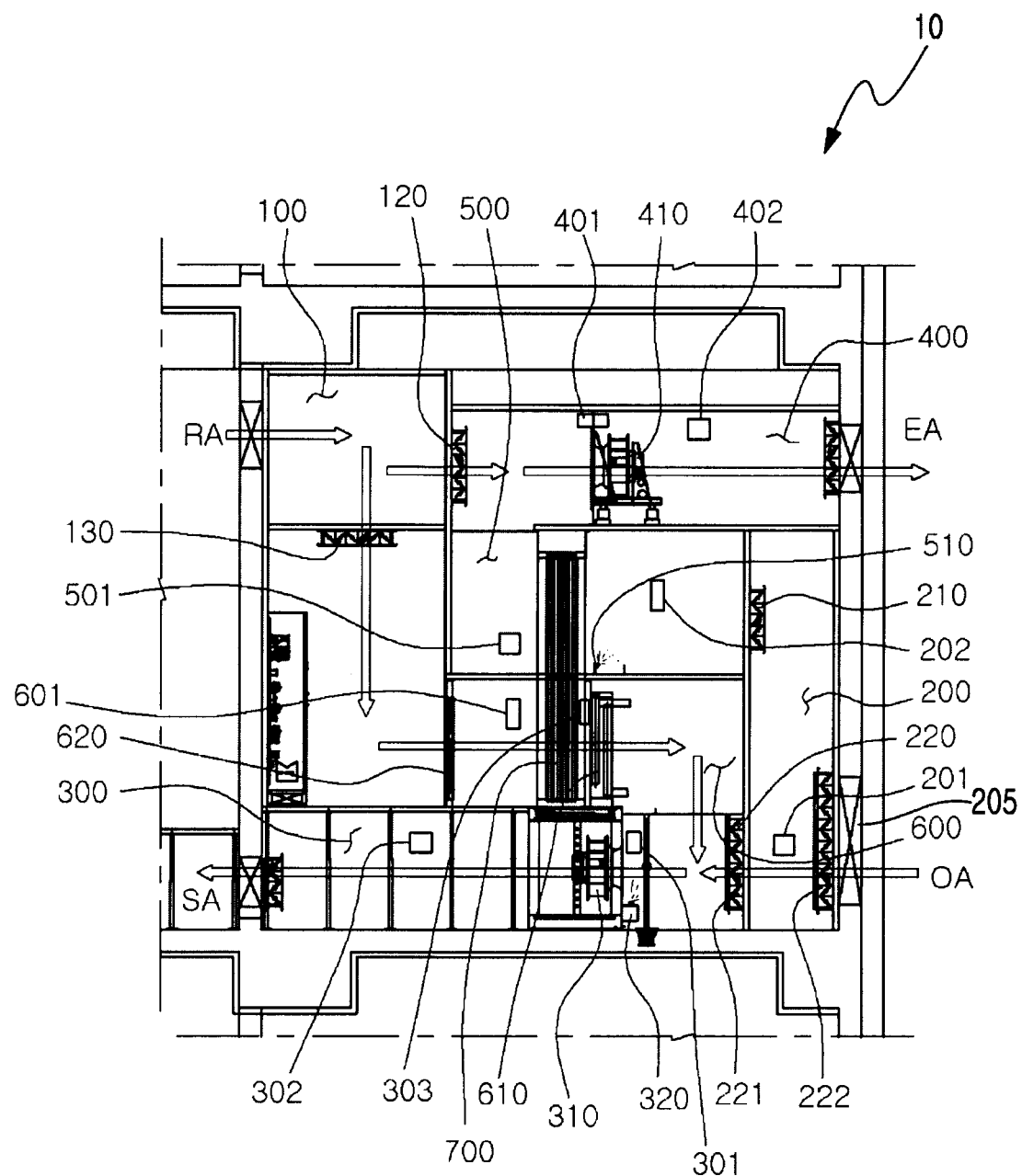
FIG. 3 is an exemplary diagram showing the state in which air-conditioning is controlled by the mixing of outside air OA with ventilation air RA according to an embodiment of the present invention.

Referring to, FIG. 3, the mixed operation mode is an air-conditioning operation mode in which ventilation air and outside air are mixed, changed into supply air, and supplied indoors. The ventilation block 100 is open and the first air damper 120 and the second air damper 130 are open, so the ventilation air flows from indoors to the second heat exchange block 600 and the air exhaust block 400 along the ventilation block 100. At this time, the degree of opening of the first air damper 120 and the second air damper 130 is controlled depending on an outside air temperature.

Furthermore, in the outside air block 200, the fourth air damper 220 is open, so the outside air flows from the outside to the air supply block 300 through the outside air block. At this time, the degree of opening of the fourth air damper 220 is controlled depending on the state of the outside air. The outside air flowing into the air supply block 300 passes through the fourth air damper 220, and the outside air is mixed with the ventilation air flowing out of the second heat exchange block 600 and supplied indoors through the air supply block 300.

Furthermore, the exhaust air changed from the outside air drained from the first heat exchange block 500, if any, also flows into the air exhaust block 400 and is discharged to the outside along the air exhaust block 400.

In the mixed operation mode, the mist spray nozzle 510 is driven and the cooling coil 610 is not driven so that the outside air is cooled when outside air wet-bulb temperature<set temperature.

Figure 4:
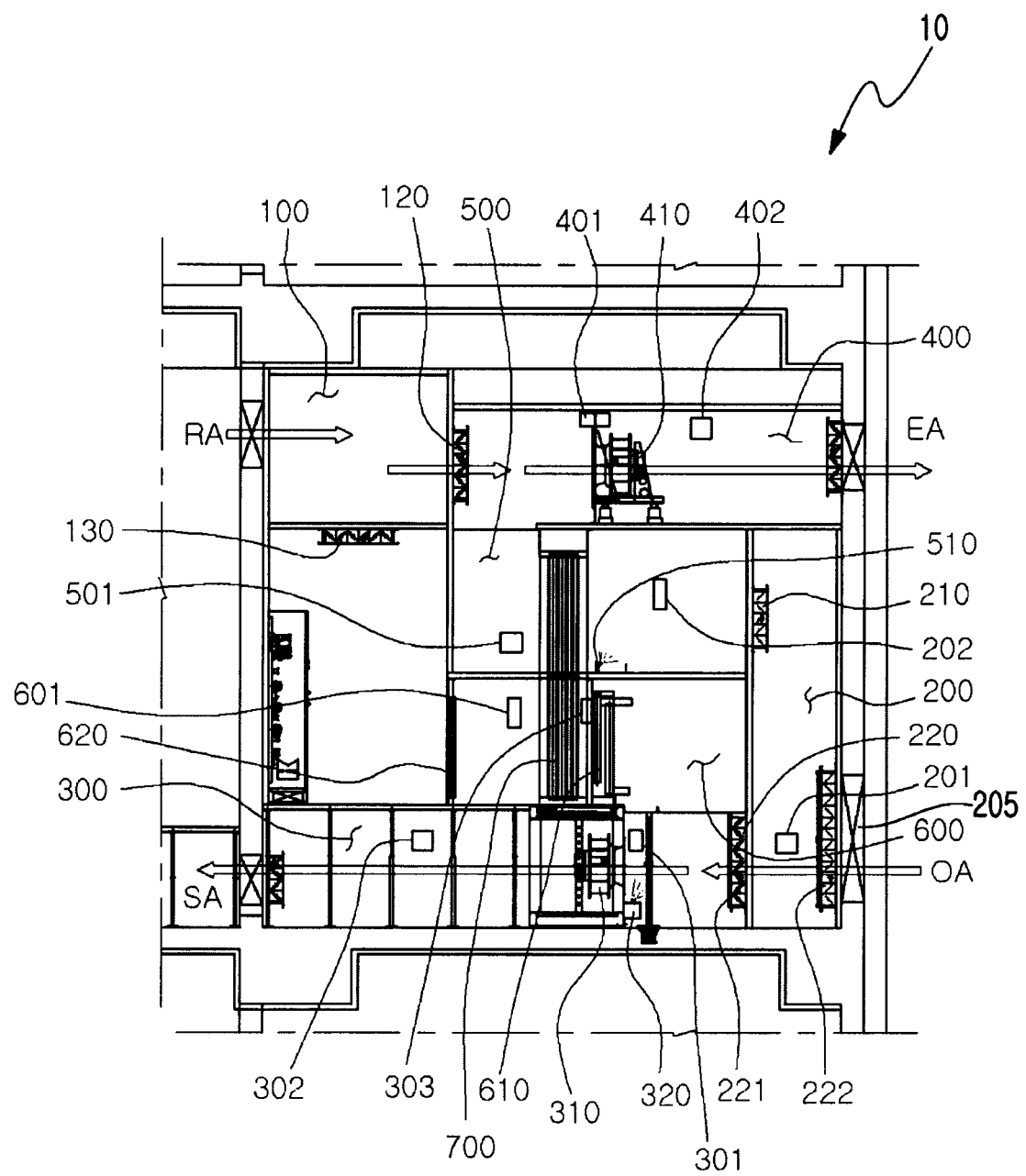
FIG. 4 is an exemplary diagram showing the state in which air-conditioning is controlled by outside air OA according to an embodiment of the present invention.
Figure 5:
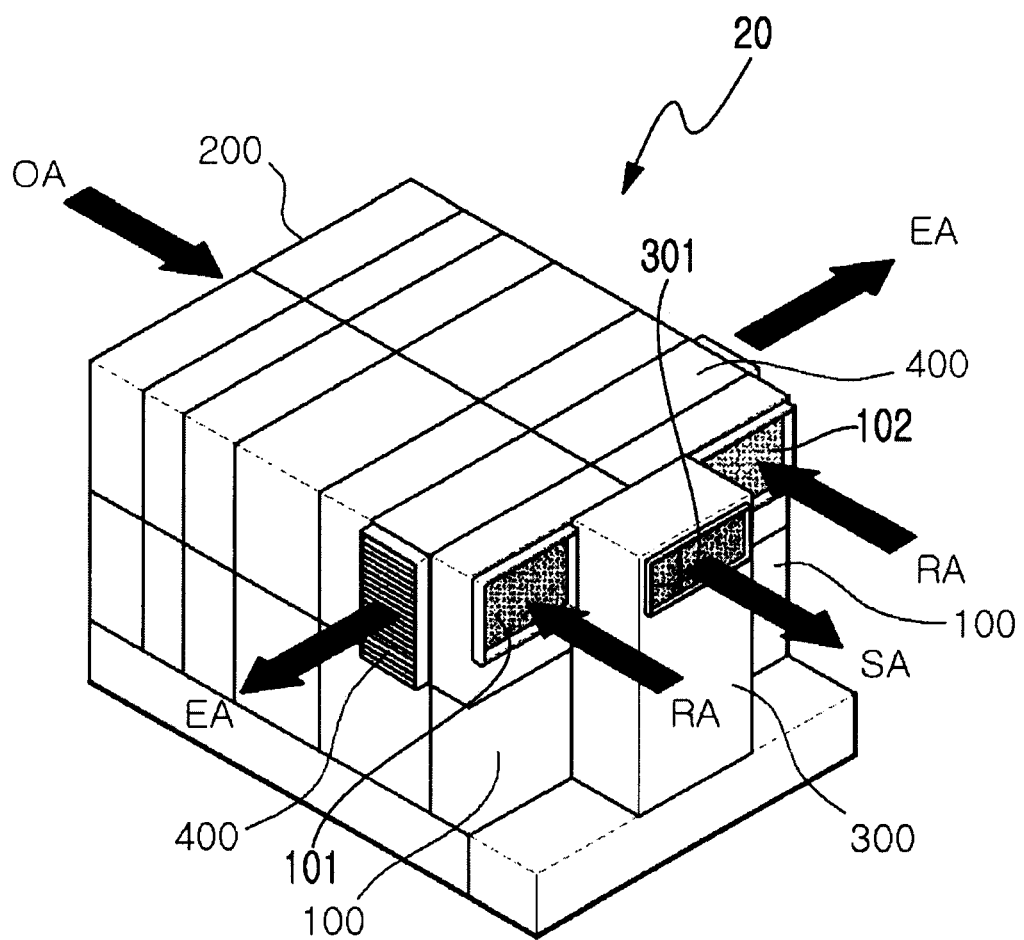
FIG. 5 is a perspective view of an air-conditioning apparatus using a heat pipe according to another embodiment of the present invention.

Referring to FIG. 4, the full outside air operation mode is an air-conditioning operation mode in which only the outside air is changed into supply air and the changed supply air is supplied indoors. In the ventilation block 100, the first air damper 120 is open and the second air damper 130 is closed. Accordingly, the ventilation air flows from indoors to the air exhaust block 400 though the ventilation block 100, and the ventilation air that flowed into the air exhaust block 400 is changed into exhaust air and then discharged to the outside through the air exhaust block 400.

Furthermore, in the outside air block 200, the third air damper 210 is closed and the fourth air damper 220 is open, so the outside air flows from the outside to the air supply block 300 through the outside air block 200.

At this time, the outside air that flowed into the air supply block 300 is changed into supply air, and the changed supply air is supplied indoors through the air supply block 300.

The full outside air operation mode is a pre-cooling mode using the outside air. In this mode, the mist spray nozzle 510 and the cooling coil 610 are not driven.

As shown in FIGS. 5 to 8, an air-conditioning apparatus 20 using a heat pipe according to another embodiment of the present invention includes the ventilation block 100, the outside air block 200, the air supply block 300, the air exhaust block 400, the first heat exchange block 500, and the second heat exchange block 600. In the present invention, one side and the other side or the front and the back indicative of directions are described based on the direction in which a fluid moves. The direction in which a fluid is introduced is one side or the front and the direction in which a fluid is drained (or discharged) is the other side or the back.

First, referring to FIGS. 5 to 8, the ventilation block 100 provides a passage through which the ventilation air introduced from indoors flows from one side to the other side of the ventilation block 100. The ventilation block 100 includes a pair of ventilation air inlets 101, 102, one each on the left and right sides of the air supply block 300 disposed at the center of the air-conditioning apparatus 20. One side of the ventilation block 100 having the ventilation air inlets 101, 102 is connected to the structure to be cooled in such a way as to communicate with the inside of the structure so that the ventilation air is introduced into the ventilation block 100 through the ventilation air inlets 101, 102. The other side of the ventilation block 100 is connected to the second heat exchange block 600 and the air exhaust block 400 in such a way as to communicate with them so that the ventilation air is drained to the second heat exchange block 600 and the air exhaust block 400.

The ventilation block 100 is equipped with a plurality of air dampers that controls the flow of the ventilation air. The first air damper 120 is disposed in an opening in a boundary or wall between the ventilation block 100 and the air exhaust block 400, and enables the ventilation block 100 and the air exhaust block 400 to communicate with each other. The ventilation air introduced from indoors to the ventilation block 100 is selectively drained to the ventilation block 100 and the air exhaust block 400 directly by the selective opening and closing of the first air damper 120.

Furthermore, a second air damper 130 is disposed on a boundary or wall between the ventilation block 100 and the second heat exchange block 600, and enable the ventilation block 100 and the second heat exchange block 600 to communicate with each other. The ventilation air introduced from indoors to the ventilation block 100 is selectively drained to the ventilation block 100 and the second heat exchange block 600 by the selective opening and closing of the second air damper 130.

Furthermore, the ventilation block 100 includes the first ventilation unit 310 and the first air volume measurement sensor 301 for measuring the air volume within the ventilation block 100. The driving and rotation speed of the first ventilation unit 310 are selectively controlled based on the measurements from the first air volume measurement sensor 301, so the volume of supply air provided indoors from the ventilation block 100 is controlled. The first air volume measurement sensor 301 measures the air volume within the ventilation block 100.

Moreover, the outside air block 200 provides a passage through which the outside air introduced from the outside through the outside air damper 205 flows from one side to the other side of the outside air block 200. One side of the outside air block 200 is connected to the outside air damper 205 in such a way as to communicate with the outside air damper so that the outside air is introduced into the outside air block 200. The other side of the outside air block 200 is connected to the first heat exchange block 500 and the air supply block 300 in such a way as to communicate with them so that the outside air is drained to the first heat exchange block 500 and the air supply block 300.

The second ventilation unit 410 is provided within the outside air block 200. The driving and rotation speed of the second ventilation unit 410 are selectively controlled, so the volume of outside air discharged from the outside air block 400 is controlled.

Furthermore, a fourth air damper 220 is disposed in an opening in a boundary or wall between the outside air block 200 and the air supply block 300, and enables the outside air block 200 and the air supply block 300 to communicate with each other. The outside air introduced from the outside to the outside air block 200 is selectively drained from the outside air block 200 to the air supply block 300 by the selective opening and closing of the fourth air damper 220.

Furthermore, a first air filter 222 is disposed in the outside air damper, and a second air filter 221 is disposed in the fourth air damper 220. The first air filter 222 removes alien substances (e.g., dust) included in outside air introduced from the outside air block 200 to the first heat exchange block 500 by filtering the alien substances. The second air filter 221 secondarily filters the air primarily filtered by the first air filter 222, and forwards the filtered air to the air supply block 300.

In this case, the first air filter 222 disposed in the outside air damper performs a pre-filter function, and the second air filter 221 performs a medium filter function.

Furthermore, the first temperature/humidity sensor 201 is disposed in an opening in the outside wall of the outside air block 200, and measures the temperature and humidity of the outside air introduced from the outside into the outside air block 200.

The air supply block 300 provides a passage through which supply air supplied indoors flows. One side of the air supply block 300 is connected to the second heat exchange block 600 and the outside air block 200 in such a way as to communicate with them. The passage extends along the lower side of the air-conditioning apparatus 20. A supply air exit 301 from which the supply air is discharged is disposed between the pair of ventilation air inlets 101, 102 of the ventilation block 100. Accordingly, the supply air changed from ventilation air through the second heat exchange block 600 enters the air supply block 300 (See FIG. 6) or outside air is directly introduced through the outside air block 200 (See FIG. 7). The supply air exit 301 of the air supply block 300 is connected to the structure to be cooled in such a way as to communicate with the inside (indoors) of the structure, and guides the supply air introduced from the second heat exchange block 600 and the outside air block 200 indoors.

Furthermore, the air exhaust block 400 provides a passage through which the exhaust air discharged to the outside flows. One side of the air exhaust block 400 is connected to the ventilation block 100 and the first heat exchange block 500 in such a way as to communicate with them, so that the exhaust air passing through the ventilation block 100 and the first heat exchange block 500 enters the air exhaust block 400. The other side of the air exhaust block 400 is connected to the outside in such a way as to communicate with the outside, so that the exhaust air introduced from the ventilation block 100 and the first heat exchange block 500 is guided out to the outside and discharged.

The first heat exchange block 500 and the second heat exchange block 600 of the air-conditioning apparatus 20 are disposed in a stack form and share the heat pipe 700. The first heat exchange block 500 contains the upper side of the heat pipe 700, the second heat exchange block 600 contains the lower side of the heat pipe 700, and the heat pipe 700 is disposed in a form that is upright at the center of the first heat exchange block 500 and the second heat exchange block 600 of the up and down stacked form.

In this case, the heat pipe 700 enables the consecutive absorption (cooling) and discharge (heating) process of heat without a separate power source because the heating medium (e.g., operating fluid) can flow due to the pressure difference between the evaporation unit and the condensation unit in a phase change process, such as the evaporation and condensation of the operating fluid.

The first heat exchange block 500 containing the upper side of the heat pipe 700 includes the condensation unit (the upper end) of the heat pipe 700. One side of the first heat exchange block 500 into which the outside air is introduced is connected to the outside air block 200, and the opposite side is connected to the ventilation block 100 and the air exhaust block 400.

In an embodiment of the present invention, the heat pipe 700 has been illustrated as including the condensation unit provided within the first heat exchange block 500, but the present invention is not limited thereto. For example, the heat pipe 700 may include an evaporation unit provided within the first heat exchange block 500.

The first heat exchange block 500 includes a third air damper 210 in an opening in a boundary or wall between the first exchange block 500 and the outside air block 200. The third air damper 210 enables the first exchange block 500 and the outside air block 200 to communicate with each other. The outside air introduced from the outside to the outside air block 200 is selectively drained from the outside air block 200 to the first heat exchange block 500 by the selective opening and closing of the third air damper 210. The first temperature sensor 202 is disposed inside the first heat exchange block 500 close to the third air damper 210, and measures the temperature of the outside air drained to the first heat exchange block 500 through the third air damper 210.

Accordingly, the first heat exchange block 500 selectively guides the outside air through the heat pipe 700 so that the outside air flows from the outside air block 200 to the air exhaust block 400 as exhaust air.

The third temperature sensor 501 is disposed in the air exhaust block 400, and measures temperature of the outside air that has passed through the heat pipe 700, i.e, the exhaust air.

Furthermore, the mist spray nozzle 510 is provided at the front of the first heat exchange block 500 connected to the outside air block 200. The mist spray nozzle 510 selectively sprays mist to the outside air introduced through the outside air block 200 so that the outside air is cooled by the evaporation latent heat phenomenon of the mist.

Furthermore, the second heat exchange block 600 disposed on the lower side of the heat pipe 700 includes the lower piece of the heat pipe 700. One side of the second heat exchange block 600 into which the ventilation air is introduced is connected to the ventilation block 100, and the opposite side is connected to the outside air block 200 and the air supply block 300.

In an embodiment of the present invention, the heat pipe 700 has been illustrated as including the evaporation unit within the second heat exchange block 600, but the present invention is not limited thereto. For example, the heat pipe 700 may include a condensation unit within the second heat exchange block 600.

The second heat exchange block 600 selectively changes ventilation air through the heat pipe 700 from the ventilation block 100 into supply air, and guides the changed supply air so that it flows into the air supply block 300.

Furthermore, the cooling coil 610 is provided at the back (downstream) of the evaporation unit (the lower end) of the heat pipe 700. The cooling coil 610 selectively cools the ventilation air passing through the heat pipe 700.

In this case, the third air filter 620 is provided at the front (upstream) of the evaporation unit (the lower end) of the heat pipe 700 provided within the second heat exchange block 600. The third air filter removes alien substances (e.g., dust) included in ventilation air introduced through the ventilation block 100 and flowing through the second heat exchange block 600 by filtering the alien substances.

Furthermore, the humidifier 320 is provided at the back (downstream) of the cooling coil 610, and selectively humidifies the supply air drained from the second heat exchange block 600 to the air supply block 300.

Figure 6:
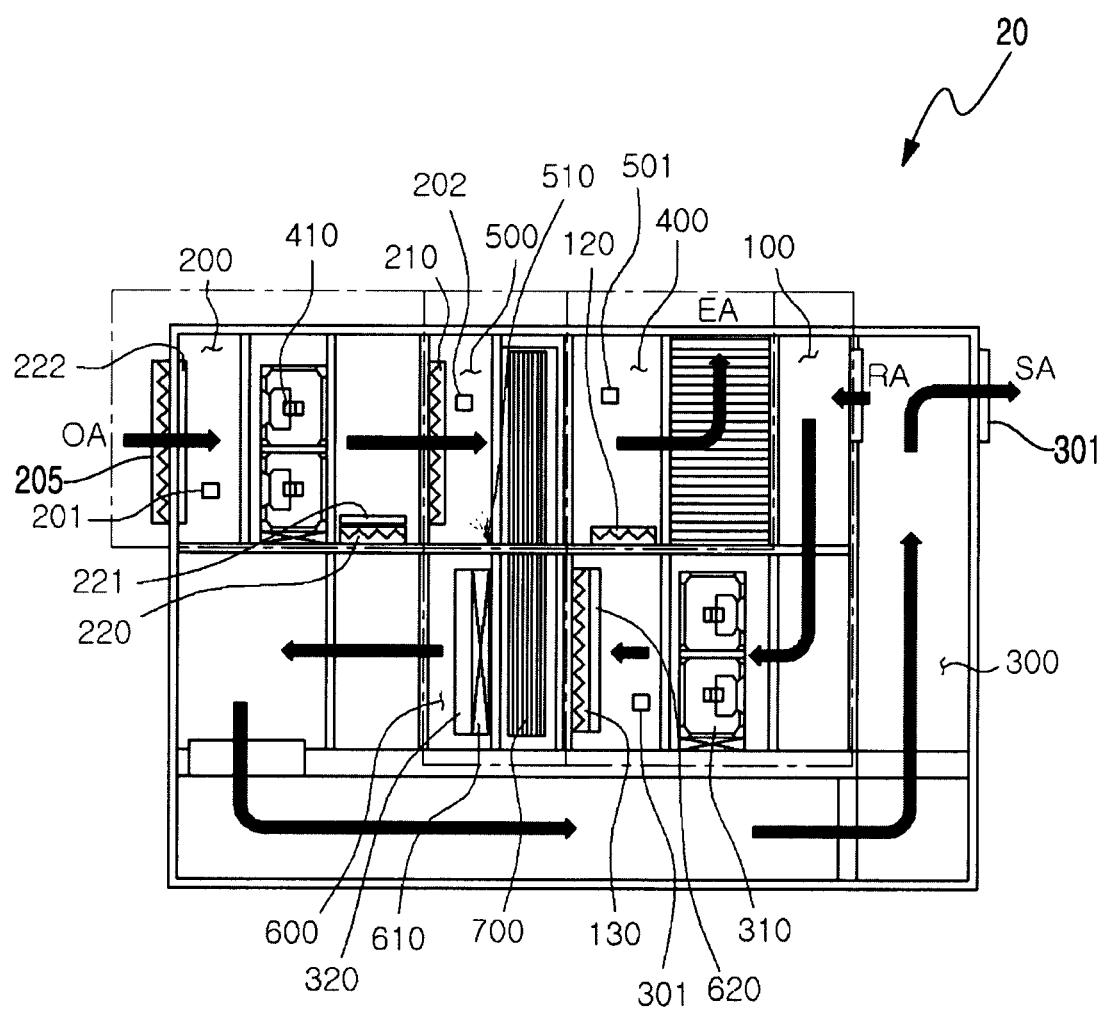
FIG. 6 is an exemplary diagram showing a flow of air-conditioning in a heat pipe (heat exchange) operation mode according to another embodiment of the present invention.

FIG. 6 shows a flow of air-conditioning in a heat pipe (heat exchange) operation mode. Ventilation air that becomes hot indoors flows into the ventilation block 100, and it is cooled through contact with the evaporation unit (the lower end) of the heat pipe 700 while passing through the second heat exchange block 600. Accordingly, the ventilation air is changed into supply air and then supplied indoors again through the air supply block 300.

In this case, outside air enters the outside air block 200, and takes the heat of the operating fluid through contact with the condensation unit (the upper end) of the heat pipe 700 while passing through the first heat exchange block 500. Accordingly, the outside air is heated, changed into exhaust air, and discharged to the outside through the air exhaust block 400.

In this case, the heat pipe 700 enables the heating medium (operating fluid) to move due to a pressure difference between the evaporation unit and the condensation unit in a phase change process, such as the evaporation and condensation of the operating fluid. Accordingly, the absorption (cooling) and discharge (heating) process of heat is consecutively performed without a separate power source.

Figure 7:
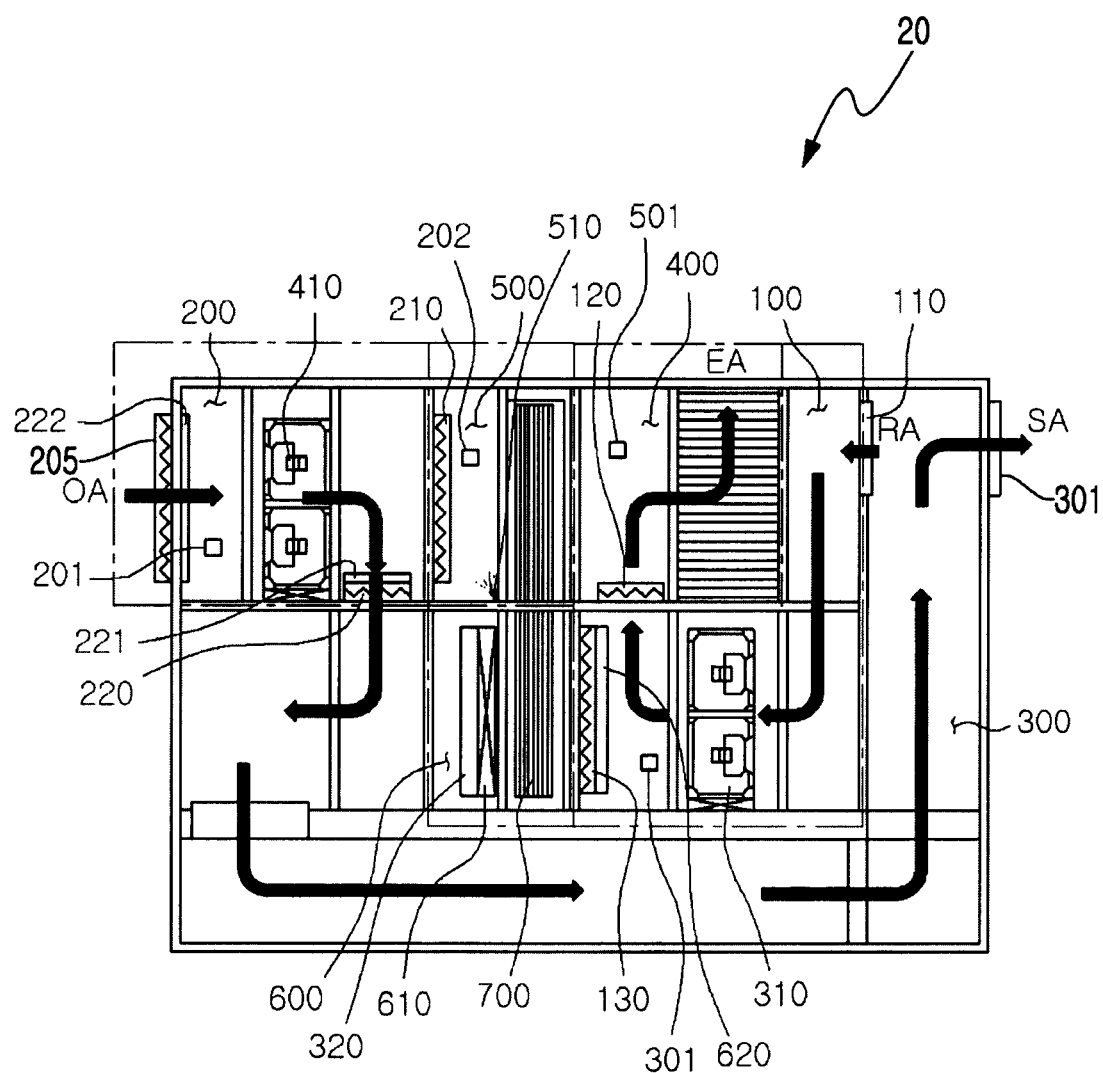
FIG. 7 is an exemplary diagram showing a flow of air-conditioning in a full outside air operation mode according to another embodiment of the present invention.

FIG. 7 shows a flow of air-conditioning in a full outside air operation mode according to another embodiment of the present invention. Ventilation air that becomes hot indoors enters the ventilation block 100. The hot ventilation air is directly discharged to the outside through the air exhaust block 400 because the second air damper 130 is closed and the first air damper 120 is open. The outside air enters the outside air block 200, and it is supplied indoors through the air supply block 300 without passing through the first heat exchange block 500 because the third air damper 210 is closed and the fourth air damper 220 is open.

Figure 8:
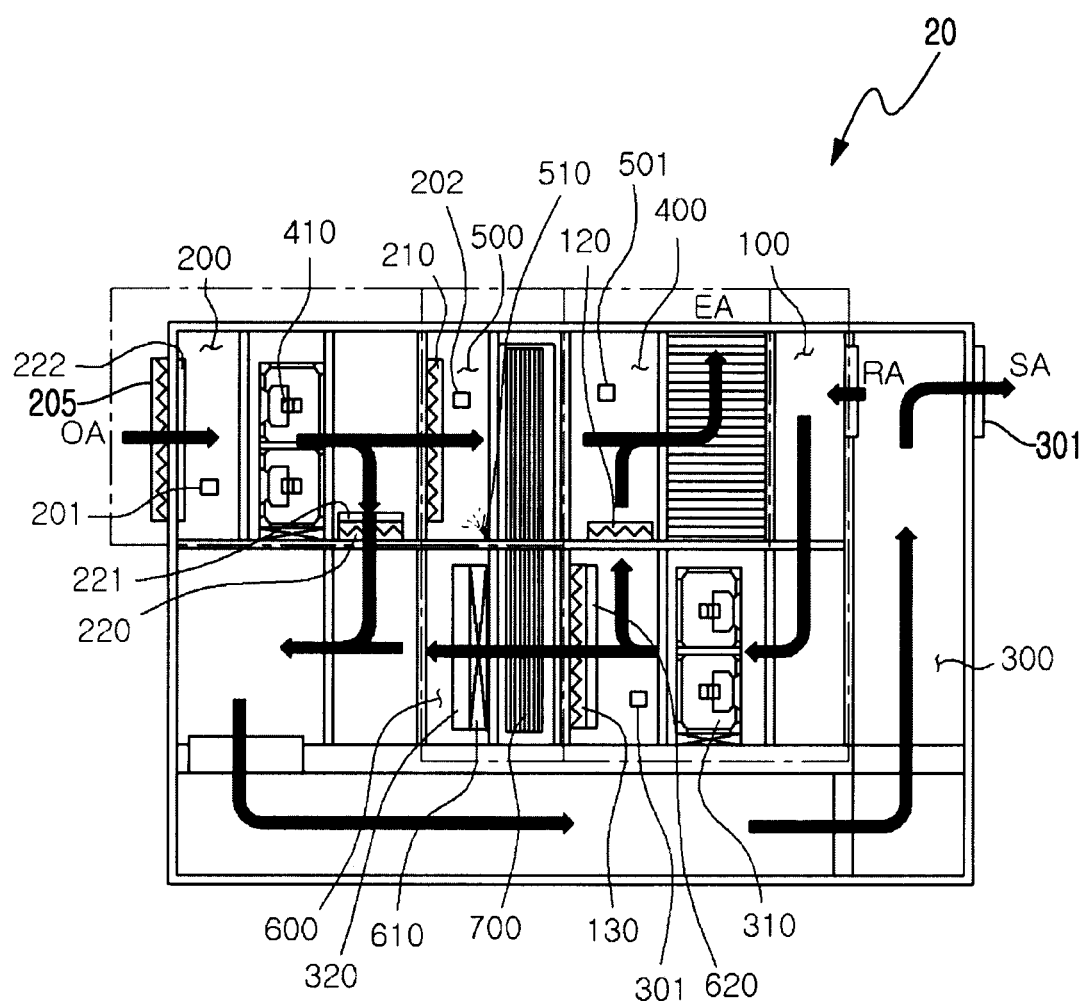
FIG. 8 is an exemplary diagram showing a flow of air-conditioning in a mixing operation mode according to another embodiment of the present invention.

FIG. 8 shows a flow of air-conditioning in a mixing operation mode according to another embodiment of the present invention. Since all of the air dampers included in the air-conditioning apparatus 20 using the heat pipe 700 are open, ventilation air that becomes hot indoors enters the ventilation block 100. The hot ventilation air is cooled through contact with the evaporation unit (the lower end) of the heat pipe 700 while passing through the second heat exchange block 600, changed into supply air and supplied indoors again through the air supply block 300.

At this time, some of the ventilation air is directly discharged to the outside through the air exhaust block 400 because the first air damper 120 is open.

Furthermore, the outside air enters the outside air block 200. The outside air takes the heat of the operating fluid through contact with the condensation unit (the upper end) of the heat pipe 700 while passing through the first heat exchange block 500, and it is heated, changed into exhaust air, and then discharged to the outside through the air exhaust block 400.

At this time, some of the outside air enters the air supply block 300 without passing through the first heat exchange block 500 because the fourth air damper 220 is open. The outside air is mixed with the supply air, changed from ventilation air and cooled through contact with the evaporation unit (the lower end) of the heat pipe 700, at a corresponding ratio and is then supplied indoors through the air supply block 300.

Accordingly, if it is difficult to directly introduce the outside air depending on an environment condition of the outside air, energy can be reduced through indirect heat exchange. If outside air can be directly introduced, a very effective solution according to an environment can be obtained through direct introduction (pre-cooling).

The air-conditioning apparatus using a heat pipe according to the embodiments of the present invention has the following effects.

First, outside air can be used as cooling energy through heat exchange using a heat pipe, and upon the heat exchange of the heat pipe, an additional cooling effect can be obtained through evaporation and cooling of the outside air by performing mist spray on the outside air.

Second, the energy necessary for an air-conditioning apparatus operation can be reduced by supplying outside air as supply air and discharging ventilation air in the (pre-cooling) condition in which the outside air can be directly used as supply air, and the supply air may selectively pass through the cooling coil or the humidity of the supply air can be controlled.

Third, the energy for the air-conditioning apparatus can be reduced because the heat exchange and mixed supply of the outside air and ventilation air can be effectively performed, and energy efficiency can be improved using the evaporation latent heat of water.

Fourth, the operation costs can be reduced and financial gains can be obtained because an efficient operation can be performed in response to the state (e.g., temperature, humidity or wet-bulb temperature) of the measured outside air.

Although the present invention has been described in connection with the embodiments illustrated in the drawings, the embodiments are only illustrative. Those skilled in the art to which the present invention pertains may understand that various other modifications and equivalent embodiments are possible. Accordingly, the true range of protection of the present invention should be determined by the technological spirit of the following claims.

What is claimed is:

1. An air-conditioning apparatus using a heat pipe, comprising:
  a ventilation block providing a passage through which ventilation air (RA) introduced from indoors flows;
  an air exhaust block having one end connected to the ventilation block and providing a passage through which exhaust air (EA) discharged to an outside flows;
  an air supply block providing a passage through which supply air (SA) supplied indoors flows;
  an outside air block having one end connected to the air supply block and providing a passage through which outside air (OA) introduced from the outside flows;
  a heat pipe having a first side and a second side, said first side including a condensation unit and said second side including an evaporation unit, wherein a pressure of said condensation unit and a pressure of said evaporation unit are different;
  a first heat exchange block comprising said condensation unit of the heat pipe, connected to the outside air block and the air exhaust block, changing outside air introduced through the outside air block into exhaust air through the heat pipe, and discharging the changed exhaust air to the air exhaust block; and
  a second heat exchange block comprising said evaporation unit of the heat pipe, connected to the ventilation block and the air supply block, changing ventilation air introduced through the ventilation block into supply air through the heat pipe, and discharging the changed supply air to the air supply block,
  wherein the second heat exchange block comprises a cooling coil disposed at a back of the evaporation unit of the heat pipe within the second heat exchange block to selectively cool ventilation air from the heat pipe, and
  wherein a first temperature sensor is provided between the heat pipe and the cooling coil to measure a temperature of ventilation air from the heat pipe,
  wherein the second heat exchange block selectively discharges the ventilation air introduced through the ventilation block into the air supply block, or mixes the ventilation air and the outside air, and changes the mixed ventilation air and outside air into supply air, and supplies the supply air, and
  wherein the air-conditioning apparatus operates in any one of a ventilation air operation mode in which only ventilation air is selectively changed into supply air and the changed supply air is supplied indoors, a mixed operation mode in which ventilation air and outside air are mixed, changed into supply air and supplied indoors, and a full outside air operation mode in which only outside air is changed into supply air and supplied indoors, based on a state of at least one of outside air, ventilation air or the supply air.

2. The air-conditioning apparatus of claim 1, wherein the ventilation block comprises:
  a first air damper disposed in a boundary between the ventilation block and the air exhaust block and selectively opened and shut to discharge ventilation air flowing into the ventilation block to the air exhaust block; and
  a second air damper disposed in the ventilation block and selectively opened and shut to discharge ventilation air flowing into the ventilation block to the second heat exchange block.

3. The air-conditioning apparatus of claim 2, wherein the outside air block comprises:
  a first air filter disposed in an outside air damper disposed in an opening through which outside air is introduced to remove alien substances included in the outside air;
  a third air damper disposed in a boundary between the outside air block and the first heat exchange block and selectively opened and shut to discharge outside air flowing into the outside air block to the first heat exchange block;
  a fourth air damper disposed in a boundary between the outside air block and the air supply block and selectively opened and shut to discharge outside air flowing into the outside air block to the air supply block;
  a second air filter disposed in the fourth air damper to remove alien substances included in the outside air passing through the fourth air damper;
  a first temperature/humidity sensor disposed in an opening through which outside air is introduced from the outside to measure a temperature and humidity of the outside air introduced through the opening from the outside; and
  a second temperature sensor disposed close to the third air damper to measure a temperature of the outside air after the outside air passes through the third air damper.

4. The air-conditioning apparatus of claim 1, wherein the air supply block comprises:
  a first air volume measurement sensor disposed within the air supply block to measure an air volume within the air supply block;
  a first ventilation unit disposed within the air supply block to selectively control an air volume of supply air;
  a temperature/humidity sensor disposed within the air supply block to measure a temperature and humidity of the supply air through the first ventilation unit.

5. The air-conditioning apparatus of claim 4, further comprising a humidifier disposed at a front of the first ventilation unit of the air supply block to selectively humidify supply air flowing into the air supply block depending on a setting state so that the supply air is humidified.

6. The air-conditioning apparatus of claim 4, wherein the air exhaust block comprises:
  a second air volume measurement sensor disposed within the air exhaust block to measure an air volume within the air exhaust block;
  a second ventilation unit disposed within the air exhaust block to selectively control an air volume of an exhaust air; and
  a temperature/humidity sensor disposed within the air exhaust block to measure a temperature and humidity of the exhaust air through the second ventilation unit.

7. The air-conditioning apparatus of claim 1, further comprising:

a second temperature sensor disposed near the condensation unit of the heat pipe of the first heat exchange block to measure a temperature of outside air through the heat pipe; and a mist spray nozzle disposed at a front of the first heat exchange block connected to the outside air block to selectively spray mist to outside air through the outside air block depending on a set temperature.

8. The air-conditioning apparatus of claim 3, wherein the second heat exchange block comprises:

a third temperature sensor disposed near the evaporation unit of the heat pipe within the second heat exchange block to measure a temperature of ventilation air before the ventilation air passes through the heat pipe; and a third air filter disposed at a front of the evaporation unit of the heat pipe to filter alien substances included in ventilation air passing through the heat pipe.

* * * * *